United States Patent Office 3,002,951
Patented Oct. 3, 1961

3,002,951
METHOD OF POLYMERIZING CYCLIC DIORGANOSILOXANES
Oskar K. Johannson, Midland, Mich., assignor to Dow Corning Corporation, Midland, Mich., a corporation of Michigan
No Drawing. Filed Apr. 27, 1959, Ser. No. 808,952
4 Claims. (Cl. 260—46.5)

This invention relates to the alkaline polymerization of certain cyclotrisiloxanes.

This application is a continuation-in-part of applicant's copending application Serial No. 594,107, filed June 27, 1956, and bearing the same title as the instant application, now abandoned.

One of the difficulties which has long plagued the silicone art has been the formation of high molecular weight polymers from organosiloxanes having relatively large groups attached to the silicon atom. The matter becomes particularly acute when one or both of the organic groups attached to the silicon exceeds two carbon atoms in size. The reason is that such siloxanes when polymerized with alkali according to conventional methods produce a high proportion of cyclic siloxanes. In some instances, particularly with the type of siloxane hereinafter defined, it has been found that a polymer subjected to alkaline polymerization conditions is degraded to give essentially 100% of the cyclic tetrasiloxane. It has also been found if one starts with the cyclic tetrasiloxane or higher cyclics and subjects them to alkaline polymerization conditions, that no apparent polymerization occurs.

The reason for this phenomena is the fact that during alkaline polymerization of diorganosiloxanes, two reactions are occurring simultaneously. One is the rupture of siloxane bonds to form higher polymers, and the other is the rupture of siloxane bonds to form cyclic low polymers. Thus in any alkaline polymerization, the resulting product is an equilibrium distribution represented by the equation

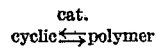

cyclic ⇌ polymer

In the case of the fluoroalkyl siloxanes, the equilibrium favors the almost exclusive formation of the cyclictetrasiloxane at the expense of high polymer.

Applicant has found, however, that this difficulty can be avoided by carrying out the polymerization in accordance with the method of this invention.

It is the primary object of this invention to provide a method of preparing high polymers of diorganosiloxanes in good yields under economically feasible conditions. Another object is to provide a method of preparing proper raw materials for the preparation of siloxane rubbers of the type not heretofore available. Other objects and advantages will be apparent from the following description.

This invention relates to a method of preparing high polymer siloxanes which comprises heating a cyclotrisiloxane of the unit formula

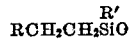

RCH₂CH₂SiO in which R is a perfluoroalkyl radical of from 1 to 10 carbon atoms and R' is an aliphatic hydrocarbon radical of less than 3 carbon atoms, in the presence of alkaline catalyst of the group alkali metal hydroxides, quaternary ammonium hydroxides, and organosilicon salts of said hydroxides at a temperature and for a time sufficient to cause polymerization of the cyclotrisiloxane to the desired polymer without causing appreciable degradation of the polymer so formed to cyclosiloxanes.

The crux of the method of this invention is to maintain the conditions of temperature and time so that the defined cyclotrisiloxanes will form high polymers (either homopolymers or copolymers) at a rate appreciably greater than the degradation of these high polymers to cyclic siloxanes. By applying the conditions which will cause this phenomenon one can obtain high polymeric siloxanes in excellent yields. (It should be understood that the cyclics formed by degradation of the high polymer are primarily cyclotetrasiloxanes.) The optimum temperature and time for any particular cyclotrisiloxane must be determined for each system. In general the more rapid the polymerization of the cyclic trisiloxane the lower the temperature and the shorter the time necessary to give the desired high polymer. If the optimum temperature for a very reactive siloxane is grossly exceeded, the rate of depolymerization will be so great the siloxane may be polymerized and degraded all in a matter of a few minutes. Furthermore, if the optimum time at any particular temperature is grossly exceeded, the polymer formed will be degraded to cyclics.

In general the polymerization of the cyclosiloxanes of this invention can be carried out at temperatures ranging from 30° C. to 250° C. or higher for times varying from 5 minutes to 3 days.

Another factor which affects the rate of the reaction is the alkalinity of the catalyst. For any given cyclic siloxane more rapid polymerization takes place under given conditions of temperature with a more alkaline catalyst. Thus one can control the rate of polymerization by choosing a catalyst of the desired alkalinity. For example, a polymerization which will proceed in 5 minutes with potassium hydroxide may require several hours or days with lithium hydroxide. It can be seen, therefore, that the polymerizations of this invention can be readily controlled by choosing the proper temperature and catalyst combinations. Thus the higher the temperature and the stronger the catalyst the more rapid will be the polymerization. The lower the temperature and the weaker the catalyst the longer the polymerization will take.

The amount of catalyst employed is not critical and may range from 1 alkali ion per 100 silicon atoms to 1 alkali ion per 200,000 silicon atoms. Although polymerizations can be obtained with even less alkali, the process is not practical since it requires only extremely small amounts of acidic impurities to destroy the catalyst.

The cyclotrisiloxanes which are within the scope of this invention include any cyclotrisiloxane in which R' is methyl, ethyl or vinyl and in which R is any perfluoroalkyl radical of from 1 to 10 carbon atoms such as $CF_3$, $C_2F_5$, $C_3F_7$, $C_7F_{15}$ and $C_{10}F_{21}$. These perfluoroalkyl radicals can be either straight or branched chain radicals. Thus it can be seen that specific examples of cyclotrisiloxanes within the scope of this invention are

$(CF_3CH_2CH_2SiO)_3$     $(C_3F_7CH_2CH_2SiO)_3$ $C_2H_5$                       $C_2H_5$ and

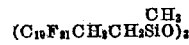

$(C_{10}F_{21}CH_2CH_2SiO)_3$ $CH_3$

It should be understood that any of the above cyclosiloxanes can be polymerized either alone to give homopolymers or two or more of the cyclosiloxanes can be copolymerized to give copolymers.

If desired, the cyclotrisiloxanes of this invention can be copolymerized with up to 10 mol percent cyclosiloxanes of the formula $(R''_2SiO)_3$ in which R'' is methyl, phenyl or vinyl as is shown in the copending application of Eric D. Brown, filed June 27, 1956, entitled "Low Swell High Temperature Organosiloxane Rubbers." Thus, for example, the cyclotrisiloxanes of this invention can be copolymerized with limited amounts of hexamethylcyclotrisiloxane, trimethyltrivinylcyclotrisiloxane, monovinylpentamethylcyclotrisiloxane, triphenyltrimethylcyclotrisiloxane, or hexaphenylcyclotrisiloxane. The preparation of such copolymers containing up to 10 mol percent of R''$_2$SiO units is considered to be within the scope of this invention.

The catalysts which may be employed in the method of this invention include any of the so-called strong alkalies such as alkali metal hydroxides, quaternary ammonium hydroxides and the organosilicon salts of such hydroxides. These salts are of the general formula $$Y_nSi(OAlk)_mO_{\frac{4-m-n}{2}}$$

in which Y is an alkali stable organic radical such as monovalent hydrocarbon radicals or fluorinated monovalent hydrocarbon radicals and (Alk) is an alkali metal or any quaternary ammonium ion, $n$ has a value from 1 to 3 inclusive and $m$ has an average value from .1 to 3. Specific examples of the catalysts of this invention are the hydroxides of cesium, potassium, sodium, and lithium, Me$_3$SiOK, PhMe$_2$SiOLi,

Et$_3$SiONa, Ph$_3$SiOK, β-hydroxyethyltrimethyl ammonium hydroxide, benzyltrimethylammonium hydroxide, didodecyldimethyl ammonium hydroxide, Me$_3$SiONMe$_4$, PhMe$_2$SiONMe$_3$CH$_2$CH$_2$OH and the benzyltrimethyl ammonium salt of dimethylsilane diol.

If desired, the polymerizations of this invention can be carried out in the presence of limited amounts of solvent. This is an unexpected result since it has heretofore been shown that ordinarily the presence of solvents tends to reduce the molecular weight of the polymers obtained during alkaline polymerization. One exception to this is the nitrogen-containing solvents shown in U.S. Patent 2,634,284. With the materials of this invention, however, high polymers can be obtained even in the presence of hydrocarbon solvents such as toluene, xylene and the like or ethers such as dibutylether.

The process of this invention is particularly adaptable for preparing rubber grade base polymers of the type disclosed and claimed in the aforesaid copending Brown application. Prior to applicant's discovery and prior to the discovery of the cyclic trisiloxanes of the formula

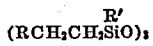

there was no known method of converting these siloxanes into polymers suitable for making high strength rubbers. Such rubbers as shown in the Brown case combine exceptionally low swell in aromatic solvents with excellent thermal stability and excellent stress strain properties.

The fluorinatedalkyl cyclic siloxanes employed in the method of this invention are best prepared by the methods described in the copending application of Ogden R. Pierce and George W. Holbrook, Serial No. 594,108, filed June 27, 1956. Briefly the cyclic siloxanes may be prepared by the series of steps of reacting olefins of the formula RCH=CH$_2$ with silanes of the formula R'SiHCl$_2$ in the presence of a platinum catalyst under conventional conditions and thereafter hydrolyzing the adduct to a siloxane and then heating the siloxane in the presence of an alkali metal hydroxide under conditions causing the cyclotrisiloxanes of this invention to distill from the reaction vessel.

An alternative method involves reacting compounds of the formula RCH$_2$CH$_2$Br with magnesium in diethylether under conventional conditions to give the correspond Grignard reagent which can then be coupled with silanes of the formula R'SiX$_3$ where X is halogen or alkoxy. This method is particularly advantageous where R' is vinyl. The resulting chlorosilanes or alkoxysilanes are hydrolyzed and cracked to the cyclic trisiloxane as above indicated.

The following examples are illustrative only and should not be construed as limiting the invention which is properly delineated in the appended claims. In the specification Me and Ph represent the methyl and phenyl radicals respectively.

Example 1

40.5 g. of

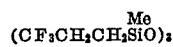

was charged into a vessel which excluded the atmosphere and the siloxane heated to 76° C. .0076 g. of the salt KO(Me$_2$SiO)$_2$K was added and the mixture was stirred. The material polymerized to a dry, high molecular weight gum in 4 to 5 minutes.

When this reaction was carried out at a temperature of 150° C. the cyclic trisiloxane polymerized to a high molecular weight polymer which then degraded to low molecular weight cyclics. The total time for polymerization and depolymerization was only 3 minutes.

All attempts to polymerize the cyclic siloxane

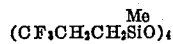

to high polymer with alkali failed. It was likewise impossible to polymerize the crude hydrolyzate of the corresponding dichlorosilane by heating with acid.

Example 2

1435 g. of CF$_3$CF$_2$CH$_2$CH$_2$Si(CH$_3$)Cl$_2$ were hydrolyzed with sufficient water to give a 20% by weight HCl solution. The hydrolyzate was washed neutral and then heated with powdered potassium hydroxide at reduced pressure under a fractionating column. 761 g. of [CF$_3$CF$_2$CH$_2$CH$_2$Si(CH$_3$)O]$_3$ were obtained by distillation. This material had a boiling point of 127° C. at .7 mm. of mercury and an $n_D^{25}$ of 1.3493.

A mixture of 46.2 g. of [CF$_3$CF$_2$CH$_2$CH$_2$Si(CH$_3$)O]$_3$ and .086 g. of [(CH$_3$)(C$_2$H$_3$)SiO]$_3$ were heated to 150° C. and .0018 g. of NaOH was added. After 20 minutes a high polymer gum was obtained. This material was suitable for making rubber.

Example 3

Employing the procedure of Example 2, the cyclic [C$_3$F$_7$CH$_2$CH$_2$Si(CH$_3$)O]$_3$ have a boiling point of 114° C. at 1 mm. and an $n_D^{25}$ of 1.3440 was obtained.

40.7 g. of this cyclotrisiloxane were mixed with .086 g. of trimethyltrivinylcyclotrisiloxane. The mixture was heated to 100° C. and .0048 g. of KOH was added. A high polymer gum formed in 10 minutes and the heating was stopped after 15 minutes. This gum was suitable for making silicone rubber.

Example 4

[CF$_3$CF$_2$CH$_2$CH$_2$Si(CH$_3$)O]$_3$ was mixed with

in amount of 1 K ion per 5,000 silicon atoms and the mixture was heated at 76° C. for 7 minutes. A high molecular weight gum was obtained. This gum was suitable for making rubbers.

Example 5

Equivalent results were obtained when

is employed in the procedure of Example 4.

Example 6

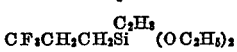

was prepared by reacting CF$_3$CH$_2$CH$_2$Br with magnesium in diethyl ether to form the corresponding Grignard reagent which was then coupled with vinyltriethoxysilane in the conventional manner. The product was hydrolyzed and cracked with KOH to give the cyclic

.504 g. of this cyclosiloxane was mixed with 194.5 g. of $$(CF_3CH_2CH_2\underset{CH_3}{Si}O)_3$$

and .0092 g. of NaOH and the mixture was heated at 150° C. for 15 minutes to form a copolymer gum of 99.75 mol percent trifluoropropylmethylsiloxane and .25 mol percent trifluoropropylvinylsiloxane. This copolymer was suitable for making a rubber.

*Example 7*

High polymer gums are obtained when $$(CF_3CH_2CH_2\underset{CH_3}{Si}O)_3$$

is mixed with the following catalysts in amount of 1 potassium ion per 5,000 silicon atoms and the mixture heated at 76° C. for 15 minutes:

Me₃SiOK

PhMe₂SiOK

*Example 8*

$$(CF_3CH_2CH_2\underset{Me}{Si}O)_3$$

was mixed with tetramethyl ammonium hydroxide in amount of 1 nitrogen atom per 5,000 silicon atoms at 30° C. In 30 seconds the cyclic had polymerized to a gum. In 3 minutes the gum degraded to cyclic siloxanes.

The experiment was repeated except that the cyclic trisiloxane was mixed with the tetramethylammonium hydroxide in amount of 1 nitrogen atom per 200,000 silicon atoms. After 70 minutes at 25° C. a gum had formed. If the polymerization is allowed to continue longer, the gum degrades to cyclic siloxanes.

In each of these experiments the polymerization was stopped at the desired point by introducing carbon dioxide rapidly into the system. This can be conveniently done by adding the carbon dioxide in the form of Dry Ice.

*Example 9*

$$(CF_3CH_2CH_2\underset{Me}{Si}O)_3$$

was mixed with the salt $$LiO[\underset{\underset{\underset{CF_3}{CH_2}}{CH_2}}{\overset{Me}{Si}}O]_3Li$$

in amount of 1 lithium ion per 5,000 silicon atoms. The mixture was heated at 150° C. and a gum was formed in 5 hours.

*Example 10*

Equivalent results are obtained when caesium hydroxide is substituted in the procedure of Example 7.

*Example 11*

Equivalent results are obtained when benzyltrimethylammonium hydroxide and when the benzyltrimethylammonium salt of methylsilanetriol is substituted in the procedure of Example 7.

That which is claimed is:

1. A method of preparing high polymeric siloxanes which comprises heating a cyclotrisiloxane of the unit formula $$RCH_2CH_2\underset{R'}{Si}O$$

in which R is a perfluoroalkyl radical of from 1 to 10 carbon atoms and R' is an aliphatic hydrocarbon radical selected from the group consisting of methyl, ethyl and vinyl radicals, in the presence of an alkaline catalyst selected from the group consisting of alkali metal hydroxides, quaternary ammonium hydroxides, organosilanol salts of alkali metal hydroxides and organosilanol salts of quaternary ammonium hydroxides, at a temperature and for a time sufficient to cause polymerization of the cyclotrisiloxane to the desired polymer without causing appreciable degradation of the polymer so formed to cyclosiloxanes and thereafter deactivating the catalyst to prevent substantial degradation of said desired polymer, said alkaline catalyst being present in amount such that there is from 1 alkali ion per 100 silicon atoms to 1 alkali ion per 200,000 silicon atoms.

2. The method of preparing high polymeric siloxanes which comprises heating a mixture of (1) cyclotrisiloxanes of the unit formula $$RCH_2CH_2\underset{R'}{Si}O$$

in which R is a perfluoroalkyl radical of from 1 to 10 carbon atoms and R' is an aliphatic hydrocarbon radical selected from the group consisting of methyl, ethyl and vinyl radicals and (2) a cyclotrisiloxane of the formula (R''₂SiO)₃ in which R'' is selected from the group consisting of methyl, phenyl and vinyl radicals, (2) being present in amount up to 10 mol percent of the mixture, in the presence of an alkaline catalyst selected from the group consisting of alkali metal hydroxides, quaternary ammonium hydroxides, organosilanol salts of alkali metal hydroxides and organosilanol salts of quaternary ammonium hydroxides, at a temperature and for a time sufficient to cause copolymerization of the cyclotrisiloxanes to the desired copolymer without causing appreciable degradation of the copolymer so formed to cyclosiloxanes and thereafter deactivating the catalyst to prevent substantial degradation of said desired copolymer, said alkaline catalyst being present in an amount of 1 alkali ion per 100 silicon atoms to one alkali ion per 200,000 silicon atoms.

3. The method in accordance with claim 1 wherein the cyclosiloxane is of the formula $$(CF_3CH_2CH_2\underset{CH_3}{Si}O)_3$$

and the alkali catalyst is an alkali metal hydroxide.

4. The method in accordance with claim 2 in which cyclosiloxane (1) is $$(CF_3CH_2CH_2\underset{CH_3}{Si}O)_3$$

and cyclosiloxane (2) is [(CH₃)(C₂H₃)SiO]₃ and the alkaline catalyst is an alkali metal hydroxide.

References Cited in the file of this patent

UNITED STATES PATENTS

| | | |
|---|---|---|
| 2,490,357 | Hyde | Dec. 6, 1949 |
| 2,495,363 | Barry et al. | Jan. 24, 1950 |
| 2,634,284 | Hyde | Apr. 7, 1953 |
| 2,737,506 | Hurd et al. | Mar. 6, 1956 |
| 2,860,152 | Fletcher | Nov. 11, 1958 |

FOREIGN PATENTS

| | | |
|---|---|---|
| 123,239 | Australia | Jan. 2, 1947 |

UNITED STATES PATENT OFFICE
CERTIFICATION OF CORRECTION

Patent No. 3,002,951                  October 3, 1961

Oscar K. Johannson

It is hereby certified that error appears in the above numbered patent requiring correction and that the said Letters Patent should read as corrected below.

In the grant, line 1, and in the heading to the printed specification, line 4, for "Oskar K. Johannson", each occurrence, read -- Oscar K. Johannson --.

Signed and sealed this 10th day of April 1962.

(SEAL)
Attest:

ERNEST W. SWIDER
Attesting Officer

DAVID L. LADD
Commissioner of Patents